United States Patent
Chen et al.

(10) Patent No.: US 11,739,227 B2
(45) Date of Patent: Aug. 29, 2023

(54) GRAPHENE PAINTING WITH ANTI-CORROSION AND HEAT DISSIPATION PROPERTIES

(71) Applicant: Dongguan Jinconn New Material Co., Ltd., Dongguan (CN)

(72) Inventors: Song Chen, Dongguan (CN); Liang Chen, Dongguan (CN); Xiangyang Liu, Dongguan (CN); Wei Li, Dongguan (CN)

(73) Assignee: DONGGUAN JINCONN NEW MATERIAL CO., LTD., Dongguan (CN)

( * ) Notice: Subject to any disclaimer, the term of this patent is extended or adjusted under 35 U.S.C. 154(b) by 176 days.

(21) Appl. No.: 17/382,460

(22) Filed: Jul. 22, 2021

(65) Prior Publication Data

US 2022/0298363 A1    Sep. 22, 2022

(30) Foreign Application Priority Data

Mar. 16, 2021  (CN) .......................... 202110281842.9

(51) Int. Cl.
| | |
|---|---|
| C09D 163/00 | (2006.01) |
| C09D 163/02 | (2006.01) |
| C09D 5/00 | (2006.01) |
| C09D 5/08 | (2006.01) |
| C09D 7/65 | (2018.01) |
| C09D 7/61 | (2018.01) |
| C09D 1/00 | (2006.01) |
| C09D 5/10 | (2006.01) |

(52) U.S. Cl.
CPC ............... *C09D 5/084* (2013.01); *C09D 1/00* (2013.01); *C09D 5/106* (2013.01); *C09D 7/61* (2018.01); *C09D 7/65* (2018.01); *C09D 163/00* (2013.01)

(58) Field of Classification Search
None
See application file for complete search history.

(56) References Cited

U.S. PATENT DOCUMENTS

2016/0280931 A1* 9/2016 Liu .................. C09D 5/106

FOREIGN PATENT DOCUMENTS

CN          109971230 A  *  7/2019  ............... C09D 5/10

OTHER PUBLICATIONS

Machine translation of CN-109971230-A (no date).*

* cited by examiner

*Primary Examiner* — Michael J Feely

(57) ABSTRACT

The invention pertains to a graphene painting. The graphene painting comprises: a component A and a component B, the component A includes 40 to 50 parts by weight of epoxy resin, 6 to 10 parts by weight of acrylic resin, 15 to 20 parts by weight of zinc powder, 0.4 to 2 parts by weight of graphene, 2 to 5 parts by weight of dispersant, 0.5 to 4 parts by weight of coupling agent, 1 to 3 parts by weight of leveling agent, 6 to 10 parts by weight of filler, 9 to 14 parts by weight of synergist, 22 to 30 parts by weight of solvent; the component B includes 1 to 4 parts by weight of curing agent, 3 to 5 parts by weight of diluent. The graphene painting is coated on the surface of a magnet, which improves the corrosion resistance of the magnet and heat dissipation performance.

9 Claims, 1 Drawing Sheet

GRAPHENE PAINTING WITH ANTI-CORROSION AND HEAT DISSIPATION PROPERTIES

CROSS REFERENCE TO PRIORITY APPLICATIONS

This application claims the benefit of Chinese Application 202110281842.9 for a graphene painting with anti-corrosion and heat dissipation properties (filed Mar. 16, 2021 at the China National Intellectual Property Administration, CNIPA). The disclosures of the above applications are incorporated herein by reference.

FIELD OF THE INVENTION

The invention pertains to the field of a graphene painting, particularly to a graphene painting with anti-corrosion and heat dissipation properties.

BACKGROUND OF THE INVENTION

Magnets are commonly used in modern industrial production and daily life. There are many types of magnets, such as AlNiCo, Samarium Cobalt, Ferrite and NdFeB. So far, NdFeB magnet is most commercialized with good magnetic performance and excellent machinability. With the economic development and social progress, NdFeB permanent magnet materials have been widely used in machinery, transportation, energy, medical services, information technology, household appliances and other industries. However, the existing NdFeB has poor heat transfer performance, and the NdFeB permanent magnet is easy to rust and oxidized, and the corrosion resistance is very poor, which makes it difficult to conduct heat to the outside, thus, further improvement is needed.

SUMMARY OF THE INVENTION

To overcome the shortcomings and deficiencies in the prior art, an object of the present invention is to provide a graphene painting with anti-corrosion and heat dissipation properties. The graphene painting with anti-corrosion and heat dissipation properties is coated on the surface of a magnet, promoting the corrosion resistance of the magnet, improving the heat dissipation performance, prolonging the service life of the magnet, and enlarging its application fields.

In accordance with an aspect of the embodiment, there is provided a graphene painting with anti-corrosion and heat dissipation properties. The graphene painting with anti-corrosion and heat dissipation properties, comprising: a component A and a component B, the component A includes 40 to 50 parts by weight of epoxy resin, 6 to 10 parts by weight of acrylic resin, 15 to 20 parts by weight of zinc powder, 0.4 to 2 parts by weight of graphene, 2 to 5 parts by weight of dispersant, 0.5 to 4 parts by weight of coupling agent, 1 to 3 parts by weight of leveling agent, 6 to 10 parts by weight of filler, 9 to 14 parts by weight of synergist, 22 to 30 parts by weight of solvent; the component B includes 1 to 4 parts by weight of curing agent, 3 to 5 parts by weight of diluent.

The graphene coating with anti-corrosion and heat dissipation properties according to the present invention includes component A and component B, the component A contains epoxy resin, dispersant and other raw materials, the component B contains curing agent. Before use, component A and component B are placed separately for easy transportation and storage, and then mix the two if used. By adding graphene to the epoxy resin mixture and combining it with acrylic resin, coupling agent, zinc powder and other raw materials, the graphene painting with anti-corrosion and heat dissipation properties is prepared; the graphene painting with anti-corrosion and heat dissipation properties according to the present invention is uniformly coated on the surface of the magnet, it is tightly combined with the magnet surface and has strong binding. It also promotes the corrosion resistance of the magnet, improves the heat dissipation performance, prolongs the service life of the magnet, and enlarges its application fields.

Furthermore, the filler is selected from at least one of the fillers: mica powder, calcium carbonate and talcum powder. The filler has a diameter of 50 nm to 100 nm. The filler is composed of mica powder, calcium carbonate and talcum powder based on a weight ratio of 1-2:0.8-1.2:1. The present invention reduces production costs by adopting the above-mentioned fillers, it also enhances the mechanical properties, weather resistance and corrosion resistance of the graphene coating with anti-corrosion and heat dissipation properties, and improves the dimensional stability and surface smoothness of the product; the nano fillers increase the specific surface area and surface absorption capacity, and improve the dispersion.

Furthermore, the epoxy resin is bisphenol A type epoxy resin. The combination of the above-mentioned epoxy resin and graphene and other raw materials makes the coating have good mechanical properties, corrosion resistance, and strong adhesion with magnets. The bisphenol A epoxy resin is preferably but not limited to bisphenol A epoxy resin E44. The solvent is composed of butanol, xylene and 1,4-butanediol glycidyl ether based on a weight ratio of 3-5:0.8-1.4:1. The acrylic resin is preferably but not limited to acrylic resin DS8030-TB.

Furthermore, the coupling agent is a silane coupling agent. The silane coupling agent is selected from at least one of the following silanes: γ-aminopropyltriethoxysilane, vinyltriethoxysilane and vinyltris (β-methoxyethoxy) silane. The silane coupling agent of the present invention improves the crosslinking density and compactness of the painting film, and helps to improve the mechanical properties, storage stability and a of the painting.

Furthermore, the dispersant is selected from at least one of the following compounds: polyacrylate, sodium polycarboxylate and sodium carboxylate. The dispersant in the present invention helps to make the graphene, the filler and other raw materials of the component A uniformly distributed in the coating system, so that the graphene is not easy to aggregate, and improves the coating performance of the painting coated on the surface of the magnet.

Furthermore, the leveling agent is selected from at least one of the following compounds: polydimethylsiloxane and cellulose acetate-butyrate. Furthermore, the leveling agent is composed of polydimethylsiloxane and cellulose acetate-butyrate based on a weight ratio of 0.8-2:1. The leveling agent of the present invention enables the graphene coating with anti-corrosion and heat dissipation properties to exhibit excellent wetting ability with the substrate, and has good compatibility with epoxy resin and other raw materials. The surface of the graphene coating with anti-corrosion and heat dissipation properties has a better leveling effect, and the coating is not prone to defects such as abnormal leveling or shrinkage, and has a good adhesion force with the surface of the magnet.

Furtherly, the preparation method of each synergist includes the following steps: mixing 9 to 12 weight percent of nano alumina, 7 to 10 weight percent of PVDF resin, 5 to 7 weight percent of maleic anhydride grafted ethylene copolymer, and 4 to 7 weight percent of γ-glycidyletheroxy-propyltrimethoxysilane with 20 to 30 weight percent of polyethylene glycol, uniformly by stirring to obtain a mixture A. The mixture A was stirred at 80° C. to 95° C., for 60 mins to 90 mins, followed by ultrasonic dispersion, centrifugal washing, and drying to obtain the synergist. The maleic anhydride grafted ethylene copolymer is preferably but not limited to maleic anhydride grafted ethylene copolymer VA1801. The PVDF resin is preferably but not limited to Kynar 761. The invention combines nano alumina, PVDF resin, maleic anhydride grafted ethylene copolymer together. The synergist has good compatibility with the epoxy resin, and helps to improve the heat dissipation performance, corrosion resistance and weather resistance of the painting, the painting is uniformly distributed along the surface of the magnet, and has good dispersion with the magnet. The thermal conductivity of graphene is 4400 W/mK to 5780 W/mK. The graphene and the nano-alumina are combined to distribute uniformly in the painting, which improves the heat dissipation of the painting and makes the performance more stable when the coated magnets are used in motor rotors and other occasions.

Furtherly, the curing agent is selected from at least one of the following compounds: diethylenetriamine, triethylenetetramine, diethylaminopropylamine and 2,4,6-tris (dimethylaminomethyl) phenol. The curing agent of the present invention is able to chemically react with the epoxy resin to form a three-dimensional polymer network, which improves the mechanical properties, corrosion resistance and adhesive force with the surface of the magnet.

Furtherly, the diluent is selected from at least one of the following compounds: xylene, ethanol, capric glycidyl ether and 1,4 butanediol glycidyl ether. Furthermore, the diluent is composed of xylene, ethanol and glycidyl ether of capric acid based on a weight ratio of 0.4-0.8:1.5-2:1. The diluent of the present invention improves the compatibility of various raw materials, so that the graphene painting with anti-corrosion and heat dissipation properties has good uniformity and coating performance.

The preparation method of the graphene painting with anti-corrosion and heat dissipation properties includes the following steps:

Preparation of Component A

A1. proportionally mixing the graphene, the coupling agent, and the dispersant, stirring evenly with a stirring rate of 1000 r/min to 1600 r/min, the stirring time lasts for 10 mins to 20 mins; then adding epoxy resin and acrylic resin, stirring at 65° C. to 70° C. for 20 mins to 40 mins to obtain the resin graphene slurry;

A2. Adding zinc powder, graphene, the dispersant, the leveling agent, filler, and the synergist into the resin graphene slurry, and stirring at 65° C. to 70° C. for 20 mins to 40 mins at a stirring rate of 1000 r/min to 1600 r/min to obtain a mixed slurry; the mixed slurry is grinded with a discharge fineness between 10 μm to 30 μm, and filtered to obtain the component A, and ready for use.

Preparation of Component B

Mixing the curing agent and the diluent, evenly by stirring at a stirring rate of 1000 r/min to 1600 r/min, the stirring time lasts for 10 mins to 20 mins, then component B is prepared and ready for use.

The preparation method of the present invention is simple, easy to control, cost cost-effective, and beneficial to industrial production, it is beneficial to prevent the graphene and the filler from agglomeration, has good coating performance, and forms a uniform and strong adhesive coating on the surface of the magnet.

The beneficial effects of the present invention lie in that: the graphene painting with anti-corrosion and heat dissipation properties of the present invention includes component A and component B. The component A contains raw materials such as epoxy resin and dispersant and the component B contains a curing agent. The component A and the component B are placed separately before use. It is convenient for transportation and storage, and they are mixed during use; by adding graphene to the epoxy resin mixture and combining it with acrylic resin, coupling agent, zinc powder and other raw materials, the graphene painting with anticorrosive and heat dissipation properties is prepared; the graphene painting is uniformly coated on the surface of the magnet, is closely combined with the surface of the magnet, has strong adhesion, which improves the corrosion resistance of the magnet, has good heat dissipation performance, prolongs the service life of the magnet, and expands its application fields.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
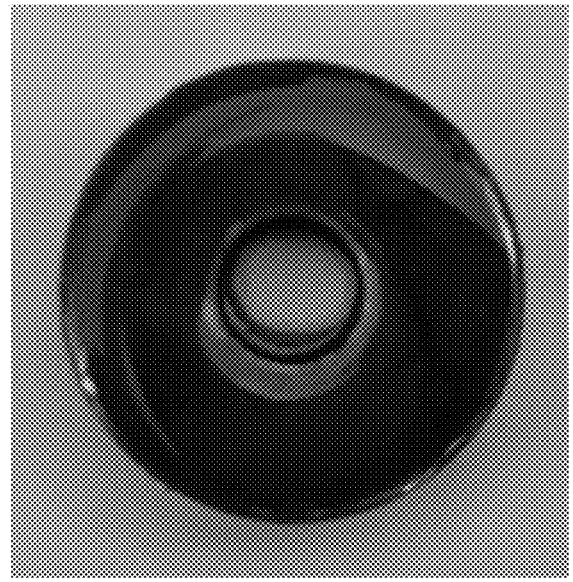
FIG. 1 is an effect image of the graphene painting partially coated on a NdFeB magnet with chromium plating and non-magnetization according to the first embodiment.

The invention will be further described below in details with reference to the figures and embodiments.

The First Embodiment

A graphene painting with anti-corrosion and heat dissipation properties, comprising: a component A and a component B, the component A includes 45 parts by weight of epoxy resin, 8 parts by weight of acrylic resin, 17 parts by weight of zinc powder, 1 parts by weight of graphene, 3 parts by weight of dispersant, 2 parts by weight of coupling agent, 2 parts by weight of leveling agent, 7 parts by weight of filler, 12 parts by weight of synergist, 25 parts by weight of solvent; the component B includes 2 parts by weight of curing agent, 4 parts by weight of diluent.

Furtherly, the filler is composed of mica powder, calcium carbonate and talcum powder based on a weight ratio of 1.5:1:1. The filler has a diameter of 50 nm to 100 nm. The epoxy resin is a bisphenol A epoxy resin E44. The solvent is composed of butanol, xylene and 1,4-butanediol glycidyl ether based on a weight ratio of 4:1:1. The acrylic resin is acrylic resin DS8030-TB.

Furtherly, the coupling agent is a silane coupling agent. The silane coupling agent is composed of γ-aminopropyl-triethoxysilane and vinyltris (β-methoxyethoxy) silane based on a weight ratio of 1:1.

Furtherly, the dispersant is sodium polycarboxylate dispersant SN-5040 or sodium polyacrylate dispersant Dispersant-9100. The leveling agent is composed of polydimethylsiloxane and cellulose acetate-butyrate based on a weight ratio of 1.2:1.

Furtherly, the preparation method of each synergist includes the following steps: mixing 11 weight percent of nano alumina, 8 weight percent of PVDF resin, 6 weight percent of maleic anhydride grafted ethylene copolymer, and 5 weight percent of γ-Glycidyl ether oxypropyl trimethoxysilane with 25 weight percent of polyethylene glycol, a composition A is prepared after being stirred and mixed uniformly. The composition A was stirred at 85° C., hold for 75 minutes, followed by ultrasonic dispersion, centrifugal washing, and drying to obtain the synergist. The maleic anhydride grafted ethylene copolymer is maleic anhydride grafted ethylene copolymer VA1801. The PVDF resin is Kynar 761.

Furtherly, the curing agent is composed of diethylenetriamine and 2,4,6-tris(dimethylaminomethyl) based on a weight ratio of 2:1.

Furtherly, the diluent is composed of xylene, ethanol and glycidyl ether of capric acid based on a weight ratio of 0.6:1.8:1.

The preparation method of the graphene painting with anti-corrosion and heat dissipation properties includes the following steps:

Preparation of Component A:

A1. proportionally mixing the graphene, the coupling agent, and the dispersant, evenly by stirring with a stirring raed of 1400 r/min, the stirring time lasts for 15 mins; then adding epoxy resin and acrylic resin and stirring at 68° C. for 30 mins to obtain resin graphene slurry;

A2. Adding zinc powder, graphene, the dispersant, the leveling agent, the filler, and the synergist into the resin graphene slurry, and stirring at 68° C. for 30 minutes at a stirring rate of 1400 r/min to obtain a mixed slurry; the mixed slurry is grinded with a discharge fineness between 10 μm to 30 μm, and filtered to obtain the component A and ready for use.

Preparation of Component B:

Mixing the curing agent and the diluent, evenly by stirring at a stirring rate of 1400 r/min, the stirring time lasts for 15 mins to prepare component B, and ready for use.

Figure 2:
FIG. 2 is an effect image of the graphene painting partially coated on a NdFeB magnet free of chromium plating and non-magnetization according to the first embodiment.

FIG. 1 is an effect image of the graphene painting partially coated on a NdFeB magnet with chromium plating and non-magnetization according to the first embodiment. The surface morphology of the coating in FIG. 1 is uniform, and the graphene is uniformly distributed. FIG. 2 is an effect image of the graphene painting partially coated on a NdFeB magnet free of chromium plating and non-magnetization according to the first embodiment. The surface morphology of the coating in FIG. 2 is also uniform, the graphene is uniformly distributed, and the surface adhesion is stronger.

The Second Embodiment

A graphene painting with anti-corrosion and heat dissipation properties, comprising: a component A and a component B, the component A includes 40 parts by weight of epoxy resin, 6 parts by weight of acrylic resin, 15 parts by weight of zinc powder, 0.4 parts by weight of graphene, 2 parts by weight of dispersant, 0.5 parts by weight of coupling agent, 1 parts by weight of leveling agent, 6 parts by weight of filler, 9 parts by weight of synergist, 22 parts by weight of solvent; the component B includes 1 parts by weight of curing agent, 3 parts by weight of diluent.

Furtherly, the filler is composed of mica powder, calcium carbonate and talcum powder based on a weight ratio of 1:0.8:1. The solvent is composed of butanol, xylene and 1,4-butanediol glycidyl ether based on a weight ratio of 3:0.8:1.

Furtherly, the coupling agent is a silane coupling agent. The silane coupling agent is composed of γ-aminopropyltriethoxysilane and vinyltris (β-methoxyethoxy) silane based on a weight ratio of 2:1.

Furtherly, the dispersant is sodium polyacrylate Dispersant-9100. The leveling agent is composed of polydimethylsiloxane and cellulose acetate-butyrate based on a weight ratio of 0.8:1.

Furtherly, the preparation method of each synergist includes the following steps: mixing 9 weight percent of nano alumina, 7 weight percent of PVDF resin, 5 weight percent of maleic anhydride grafted ethylene copolymer, and 4 weight percent of γ-Glycidyl ether oxypropyl trimethoxysilane with 20 weight percent of polyethylene glycol, uniformly by stirring to prepare a mixture A. The mixture A was stirred at 80° C., for 90 minutes, followed by ultrasonic dispersion, centrifugal washing, and drying to obtain the synergist.

Furtherly, the curing agent is composed of diethylenetriamine and 2,4,6-tris(dimethylaminomethyl) phenol based on a weight ratio of 1:1.5. The diluent is composed of xylene, ethanol and glycidyl ether of capric acid based on a weight ratio of 0.4:1.5:1.

The preparation method of the graphene painting with anti-corrosion and heat dissipation properties includes the following steps:

Preparation of Component A:

A1. proportionally mixing the graphene, the coupling agent, and the dispersant, evenly by stirring with a stirring rate of 1000 r/min, the stirring time lasts for 15 mins; then adding epoxy resin and acrylic resin, stirring at 65° C. for 35 mins to obtain a resin graphene slurry;

A2. Adding zinc powder, graphene, dispersant, leveling agent, filler, and synergist into the resin graphene slurry, and stirring at 68° C. for 30 minutes at a stirring rate of 1000 r/min to obtain a mixed slurry; the mixed slurry is grinded with a discharge fineness between 10 μm to 30 μm, and filtered to obtain the component A and ready for use.

Preparation of Component B:

Mixing the curing agent and the diluent, evenly by stirring at a stirring rate of 1000 r/min, the stirring time lasts for 20 mins and ready for use.

The Third Embodiment

A graphene painting with anti-corrosion and heat dissipation properties, comprising: a component A and a component B, the component A includes 50 parts by weight of epoxy resin, 10 parts by weight of acrylic resin, 20 parts by weight of zinc powder, 0.4 parts by weight of graphene, 2 parts by weight of dispersant, 0.5 parts by weight of coupling agent, 1 parts by weight of leveling agent, 6 parts by weight of filler, 9 parts by weight of synergist, 22 parts by weight of solvent; the component B includes 1 parts by weight of curing agent, 3 parts by weight of diluent.

Furtherly, the filler is composed of mica powder, calcium carbonate and talcum powder based on a weight ratio of 2:1.2:1. The solvent is composed of butanol, xylene and 1,4-butanediol glycidyl ether based on a weight ratio of 5:1.4:1.

Furtherly, the silane coupling agent is composed of γ-aminopropyltriethoxysilane, vinyltriethoxysilane, and vinyl tris (β-methoxyethoxy) silane based on a weight ratio of 1:1:2.

Furtherly, the dispersant is sodium polycarboxylate dispersant SN-5040. The leveling agent is composed of polydimethylsiloxane and cellulose acetate-butyrate based on a weight ratio of 2:1.

Furtherly, the preparation method of each synergist includes the following steps: mixing 12 weight percent of nano alumina, 10 weight percent of PVDF resin, 7 weight percent of maleic anhydride grafted ethylene copolymer, and 7 weight percent of γ-Glycidyletheroxypropyltrimethoxysilane with 30 weight percent of polyethylene glycol uniformly by stirring to prepare a mixture A. The mixture A was stirred at 90° C., for 60 minutes, followed by ultrasonic dispersion, centrifugal washing, and drying to obtain the synergist.

Furtherly, the curing agent is composed of diethylaminopropylamine and 2,4,6-tris (dimethylaminomethyl) phenol based on a weight ratio of 2:1.

Furtherly, the diluent is composed of xylene, ethanol and glycidyl ether of capric acid based on a weight ratio of 0.8:2:1.

The preparation method of the graphene painting with anti-corrosion and heat dissipation properties includes the following steps:

Preparation of Component A:

A1. proportionally mixing the graphene, the coupling agent, and the dispersant, evenly by stirring with a stirring rate of 1600 r/min, the stirring time lasts for 10 mins; then adding epoxy resin and acrylic resin, stirring at 70° C. for 20 mins to obtain a resin graphene slurry;

A2. Adding zinc powder, graphene, dispersant, leveling agent, filler, and synergist into the resin graphene slurry, and stirring at 70° C. for 20 minutes at a stirring rate of 1600 r/min to obtain a mixed slurry; the mixed slurry is grinded with a discharge fineness between 10 μm to 30 μm, and filtered to obtain the component A and ready for use.

Preparation of Component B:

Mixing the curing agent and the diluent, evenly by stirring at a stirring rate of 1600 r/min, the stirring time lasts for 10 mins to obtain component B and ready for use.

The Fourth Embodiment

A graphene painting with anti-corrosion and heat dissipation properties, comprising: a component A and a component B, the component A includes 46 parts by weight of epoxy resin, 7 parts by weight of acrylic resin, 16 parts by weight of zinc powder, 1.5 parts by weight of graphene, 3 parts by weight of dispersant, 3 parts by weight of coupling agent, 1.5 parts by weight of leveling agent, 7 parts by weight of filler, 11 parts by weight of synergist, 28 parts by weight of solvent; the component B includes 3 parts by weight of curing agent, 5 parts by weight of diluent.

Furtherly, the filler is composed of mica powder, calcium carbonate and talcum powder based on a weight ratio of 1.5:1:1. The solvent is composed of butanol, xylene and 1,4-butanediol glycidyl ether based on a weight ratio of 3.5:1.2:1. The leveling agent is composed of polydimethylsiloxane and cellulose acetate-butyrate based on a weight ratio of 1.4:1. The dispersant is composed of sodium polycarboxylate dispersant SN-5040 and sodium polyacrylate dispersant Dispersant-9100 based on a weight ratio of 1.5:1.

Furtherly, the preparation method of each synergist includes the following steps: mixing 11 weight percent of nano alumina, 8 weight percent of PVDF resin, 5.5 weight percent of maleic anhydride grafted ethylene copolymer, and 5 weight percent of γ-glycidyletheroxypropyltrimethoxysilane with 24 weight percent of polyethylene glycol uniformly by stirring to prepare a mixture A. The mixture A is stirred at 85° C., for 80 minutes, followed by ultrasonic dispersion, centrifugal washing, and drying to obtain the synergist.

The preparation method of the graphene painting with anti-corrosion and heat dissipation properties includes the following steps:

Preparation of Component A:

A1. proportionally mixing the graphene, the coupling agent, and the dispersant, evenly by stirring with a stirring rate of 1500 r/min, the stirring time lasts for 15 mins; then adding epoxy resin and acrylic resin, and stirring at 68° C. for 25 mins to obtain a resin graphene slurry;

A2. Adding zinc powder, graphene, dispersant, leveling agent, filler, and synergist into the resin graphene slurry, and stirring at 65° C. for 36 minutes at a stirring rate of 1300 r/min to obtain a mixed slurry; the mixed slurry is grinded with a discharge fineness between 10 μm to 30 μm, and filtered to obtain the component A and ready for use.

Preparation of Component B:

Mixing the curing agent and the diluent, evenly by stirring at a stirring rate of 1300 r/min, the stirring time lasts for 20 mins to obtain component B, and ready for use.

Contents of the fourth embodiments of the present invention are similar to that of the first embodiment and for simplicity, they will not be repeated here.

Comparative Example 1

The differences between the comparative example 1 and the first embodiment of the present invention is that: the comparative example 1 is free of the synergist, and is replaced by the same amount of epoxy resin and acrylic resin.

The graphene painting with anti-corrosion and heat dissipation properties prepared in the first embodiment to the fourth embodiment and Comparative Example 1 were dipped, pulled, cured, and coated on the circular surface of the NdFeB magnet free of chromium plating to form a graphene coating with anti-corrosion and heat dissipation properties. The coating method includes the following steps immersing a magnet body in the ready graphene paint with anti-corrosion and heat dissipation properties; pulling the magnet body upwards after dipping in the graphene paint, the magnet body is then suspended above the graphene paint. Repeating the above immersing, dipping, and pulling processes and an initial film is formed on the surface of the magnet body. The immersion time is 30 s each time, and the suspension time of the magnet body after each pulling is 80 s, repeated 40 times. The speed of pulling the magnet body each time is 3 cm/min; the initial film of the magnet body is cured to obtain a magnet coated with the graphene paint with anti-corrosion and heat dissipation properties. The curing temperature is 90° C., and the curing time is 25 minutes.

They are respectively tested according to HG/T 4759-2014. The performances are shown as below.

The appearances of the coatings in the first embodiment to the fourth embodiment and Comparative Example 1 are smooth and particle-free, the flash rust inhibition is normal. In Comparative Example 1, the coating at the curved edge is relatively less. Water resistance/500 h: there is no blistering, no peeling, no rusting or no cracking in the first embodiment to the fourth embodiment and Comparative Example 1. Salt spray resistance/500 h: there is no blistering, no peeling, no rusting, or no cracking in the first embodiment to the fourth embodiment, however, there is blistering, slight peeling, and rusting in Comparative Example 1. Alkali resistance/240 h (50 g/L, NaOH): there is no blistering, no flaking, no rusting, and no cracking in the first embodiment to the fourth embodiment; however, it is slightly peeled and rusty. Acid resistance/36 h (50 g/L, H2SO4): there is no blistering, no peeling, no rusting, and no cracking in the first embodiment to the fourth embodiment; there is blistering in Comparative Example 1.

The other performances of the first embodiment to the fourth embodiment and Comparative Example 1 are as follows:

| Item | Embodiment 1 | Embodiment 2 | Embodiment 3 | Embodiment 4 | Comparative example 1 |
| --- | --- | --- | --- | --- | --- |
| Griding test/grade | 1 | 1 | 1 | 1 | 2 |
| Impact resistance/cm | 55 | 55 | 55 | 55 | 50 |
| Glossiness/grade | 1 | 1 | 1 | 1 | 1 |

The thickness of the graphene coating formed by the graphene paint with anti-corrosion and heat dissipation properties in the first embodiment to the fourth embodiment of the present invention is between 20 µm to 25 µm. The impact resistance test takes 5 cm as an interval. The graphene paint with anti-corrosion and heat dissipation properties according to the present invention is coated on the surface of the magnet, it has adhesion with the magnet. It also promotes the corrosion resistance of the magnet, improves the heat dissipation performance, prolongs the service life of the magnet, and enlarges its application range.

The above embodiments, which are intended to enable those skilled in the art to understand the content of the disclosure and implement it accordingly, are merely for describing the technical concepts and features of the disclosure, and the scope of patent application of the disclosure cannot be defined only by the embodiments, i.e., any equivalent variations or modifications made in accordance with the spirit disclosed by the disclosure still fall within the scope of claims of the disclosure.

What is claimed is:

1. A graphene paint with anti-corrosion and heat dissipation properties, comprising:
a component A, the component A comprises:
40 to 50 parts by weight of epoxy resin,
6 to 10 parts by weight of acrylic resin,
15 to 20 parts by weight of zinc powder,
0.4 to 2 parts by weight of graphene,
2 to 5 parts by weight of dispersant,
0.5 to 4 parts by weight of coupling agent,
1 to 3 parts by weight of leveling agent,
6 to 10 parts by weight of filler,
9 to 14 parts by weight of synergist,
22 to 30 parts by weight of solvent;
a component B, component B comprises:
1 to 4 parts by weight of curing agent,
3 to 5 parts by weight of diluent, and
the parts by weight of materials present in component A or B are relative to the combined materials of components A and B.

2. The graphene paint with anti-corrosion and heat dissipation properties of claim 1, wherein the filler is selected from at least one of the following fillers: mica powder, calcium carbonate and talcum powder.

3. The graphene paint with anti-corrosion and heat dissipation properties of claim 1, wherein the epoxy resin is bisphenol A type epoxy resin.

4. The graphene paint with anti-corrosion and heat dissipation properties of claim 1, the coupling agent is a silane coupling agent, the silane coupling agent is selected from at least one of the following silanes: γ-aminopropyltriethoxysilane, vinyltriethoxysilane and vinyltris(β-methoxyethoxy) silane.

5. The graphene paint with anti-corrosion and heat dissipation properties of claim 1, wherein the dispersant is selected from at least one of the following compounds: polyacrylate, sodium polycarboxylate and sodium carboxylate.

6. The graphene paint with anti-corrosion and heat dissipation properties of claim 1, wherein the leveling agent is selected from at least one of the following compounds: polydimethylsiloxane and cellulose acetate-butyrate.

7. The graphene paint with anti-corrosion and heat dissipation properties of claim 1, wherein the preparation method of each said synergist includes the following steps: mixing 9 to 12 weight percent of nano alumina, 7 to 10 weight percent of PVDF resin, 5 to 7 weight percent of maleic anhydride grafted ethylene copolymer, 4 to 7 weight percent of γ-glycidyletheroxypropyltrimethoxysilane with 20 to 30 weight percent of polyethylene glycol uniformly to obtain a mixture A; the mixture A is stirred at 80° C. to 95° C., for 60 minutes to 90 minutes; the mixture is then ultrasonically dispersed, centrifuged, washed, and dried to obtain the synergist.

8. The graphene paint with anti-corrosion and heat dissipation properties of claim 1, wherein the curing agent is selected from at least one of the following compounds: diethylenetriamine, triethylenetetramine, diethylaminopropylamine and 2,4,6-tris(dimethylaminomethyl) phenol.

9. The graphene paint with anti-corrosion and heat dissipation properties of claim 1, wherein the diluent is selected from at least one of the following compounds: xylene, ethanol, glycidylneodecanoate, and 1,4 butanediol glycidyl ether.

* * * * *